May 2, 1961  E. W. FRIES  2,982,231
APPARATUS FOR FILLING BAKED PRODUCTS
Filed Oct. 31, 1958  2 Sheets-Sheet 1
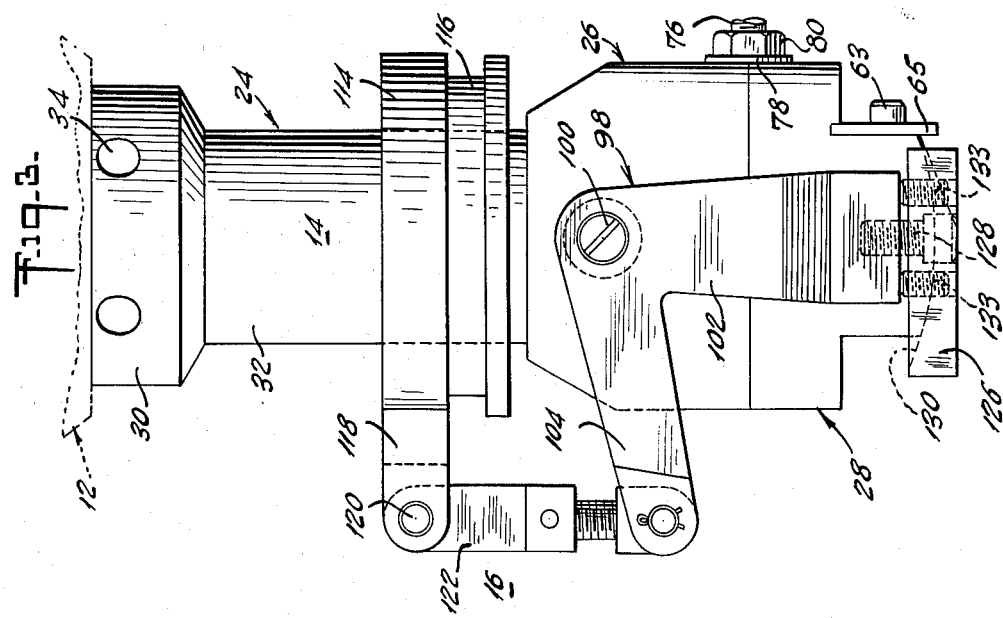
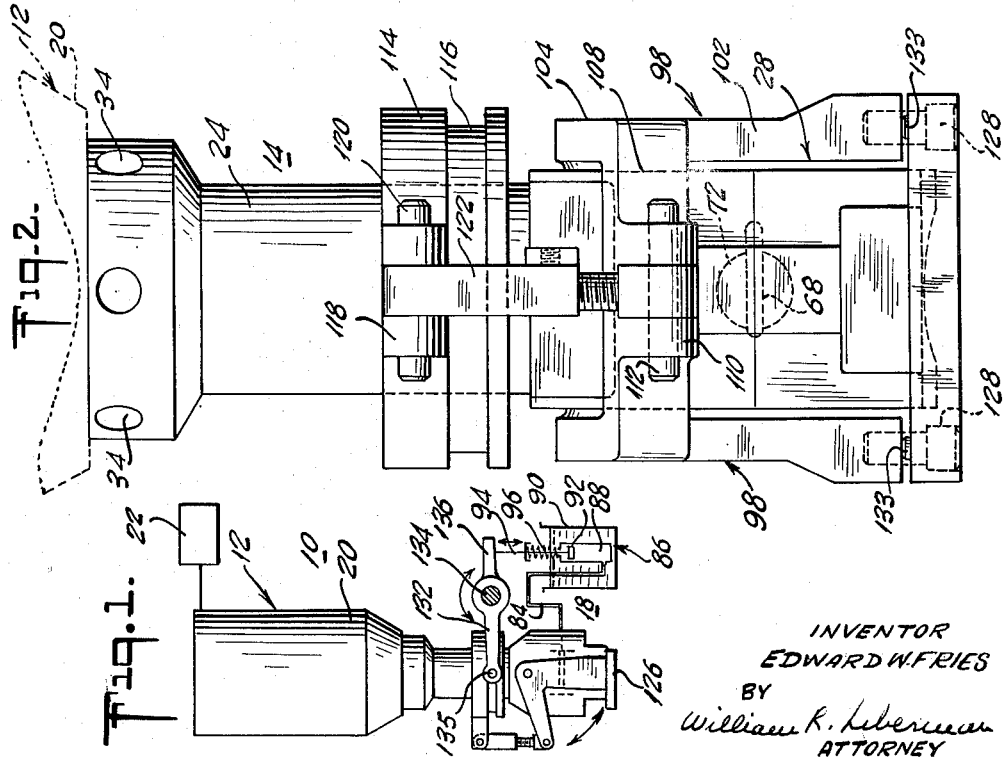
INVENTOR
EDWARD W. FRIES
BY
William R. Lieberman
ATTORNEY May 2, 1961 E. W. FRIES 2,982,231
APPARATUS FOR FILLING BAKED PRODUCTS
Filed Oct. 31, 1958 2 Sheets-Sheet 2
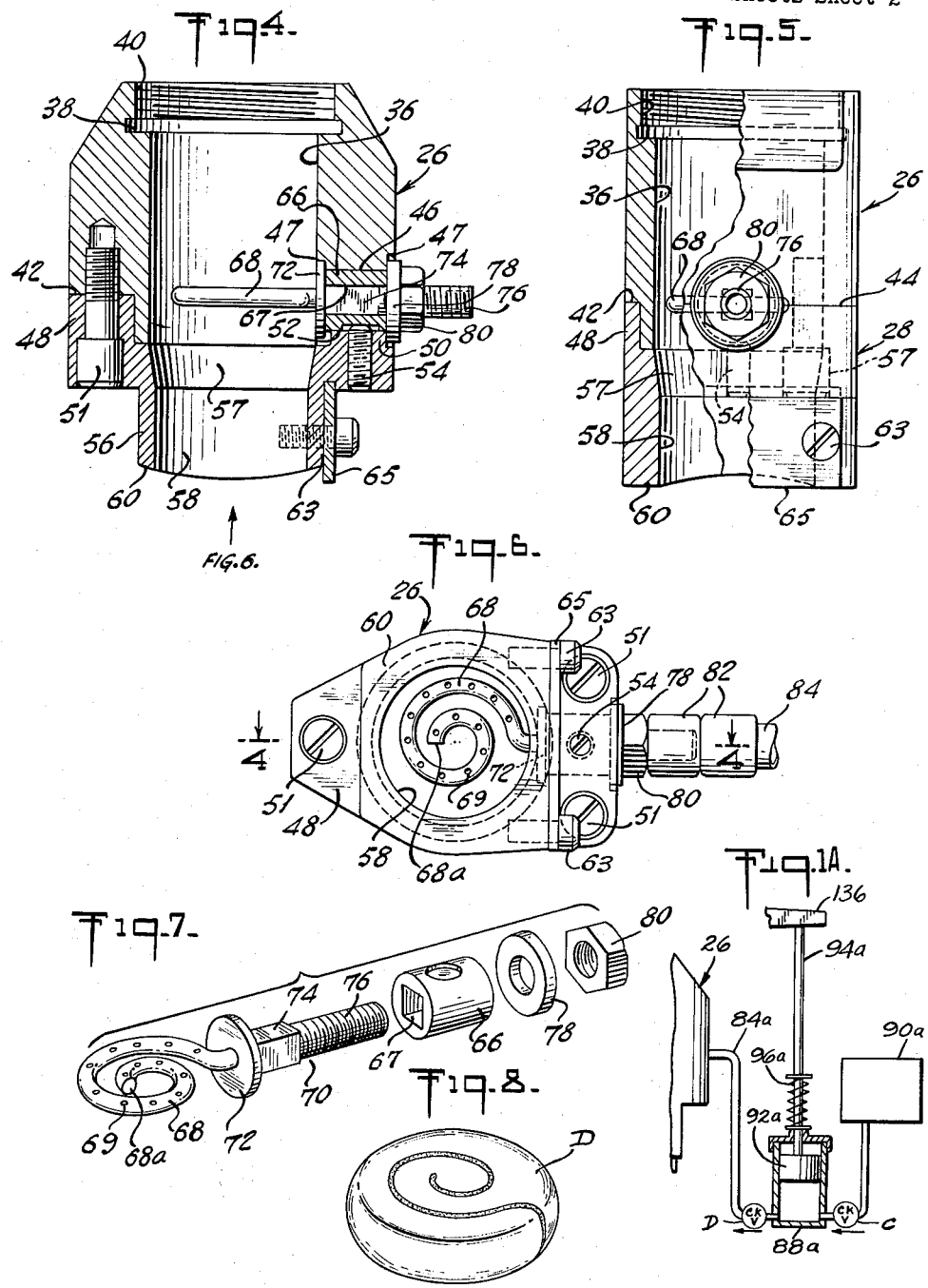
INVENTOR
EDWARD W. FRIES
BY
ATTORNEY

United States Patent Office 2,982,231
Patented May 2, 1961

2,982,231

APPARATUS FOR FILLING BAKED PRODUCTS

Edward W. Fries, Baltimore, Md., assignor to DCA Food Industries Inc., New York, N.Y., a corporation of New York
Filed Oct. 31, 1958, Ser. No. 770,965
7 Claims. (Cl. 107—1)

The present invention relates to an improved apparatus for the production of comestibles, and in particular it relates to an improved apparatus for the shaping of dough pieces in the production of baked products of various configurations, such as spiral cinnamon rolls, and the like.

The commercial production of baked products of spiral or other complex shapes is quite costly, inefficient from the standpoint of time and labor involved in the process, and the equipment and skill required in its operation. Thus, in the commercial production of cinnamon rolls or similar items, fifteen to twenty pound batches of fermented dough are manually deposited on a belt conveyor, each piece being manually stretched and flattened, and successive pieces are overlapped and pressed together to form a continuous piece or strip. The continuous strip is then passed through power driven sheeter rolls which further flatten the dough to form a sheet of the desired thickness. The sheet is delivered by the sheeter rolls onto a second horizontal belt conveyor which must be accurately timed to the rate of delivery of the sheet from the rolls to minimize tearing. While carried on the second belt, the continuous dough sheet is subjected to numerous further operations including cross grain rolling, application at various stations of thin layers of filler such as oil and cinnamon, the curling of the sheet laterally into a solid round sectional roll by means of a curling bar, the continuous cutting of the dough roll by guillotine or rotary cutter means into pieces of the desired weight and length or thickness, and the manual panning of the cut dough pieces by placing the end showing the spiral configuration in the bottom of the pan. It is apparent from the above, that the production of baked products as typified by cinnamon rolls is inefficient, highly time and labor consuming and costly, and that it leaves much to be desired.

It is, therefore, a principal object of the present invention to provide an improved apparatus for the production of comestibles.

Another object of the present invention is to provide an improved apparatus for producing shaped pieces of dough.

Still another object of the present invention is to provide an improved apparatus for producing spirally-shaped pieces of dough in which the successive convolutions are substantially in contact with each other and maintain their identity.

A further object of the present invention is to provide an improved apparatus for producing spirally shaped pieces of dough having a filling material between the confronting faces of successive convolutions.

Still a further object of the present invention is to provide an improved dough piece forming and filling device for the production of cinnamon buns or similar baked products which device is characterized by its ruggedness, simplicity, flexibility and ease of operation.

Another object of the present invention is to provide an improved dough forming device of the above character, which is of low cost and requires a minimum of personal attendance.

The above and further objects of the present invention will become apparent from a reading of the following description taken in conjunction with the accompanying drawings, wherein Figure 1 is a side elevational view of one form of the improved device constructed according to and embodying the present invention, illustrated partially in section;

Figure 1A is an enlarged detailed side elevational view of another form of fluid injection system employing a conventional piston type of metering pump;

Figure 2 is an enlarged front elevational view of the nozzle and dough cutting portion of the improved device;

Figure 3 is a side elevational view thereof;

Figure 4 is a sectional view taken along line 4—4 of Figure 6;

Figure 5 is a rear elevational view of the lower section of the nozzle, illustrated partially broken away and partially in section;

Figure 6 is a bottom plan view of the nozzle lower section;

Figure 7 is an exploded bottom perspective view of the fluid injecting device; and Figure 8 is a perspective view of a cut piece of dough produced in accordance with the present invention.

In a sense, the present invention contemplates the provision of an improved device for producing shaped pieces of dough comprising a nozzle having a discharge opening, means for extruding dough through said nozzle and discharge opening, an elongated tubular fluid injecting member located in and extending transversely of said nozzle and having openings formed along the length thereof, a fluid reservoir, a pump connected between said injecting member and said fluid reservoir and means located forward of said nozzle discharge opening for transversely cutting the dough extruded therethrough.

In accordance with a preferred embodiment of the present invention, the means for extruding the dough through the nozzle includes a hermetically sealed hopper connected to a source of air under pressure and communicating at its bottom with the nozzle. The hopper is provided with a removable lid to facilitate loading thereof with dough. The edge of the nozzle discharge opening lies in an arcuate cylindrical plane. A gate member, having a cylindrical closure surface, registers with the nozzle opening and is rockable to an open position out of registry with the nozzle opening. The gate is mounted on the first arms of a pair of parallel bell cranks pivoted to diametrically opposite points on said nozzle, the second arms of the bell crank being joined to a collar vertically reciprocably slidable along the outer face of the nozzle. A spirally shaped tubular fluid injector member is located in the nozzle above the discharge opening and is provided with a section passing through the nozzle wall and connected to the outlet of a piston pump whose inlet is connected to a source of liquid. A plurality of apertures are formed in and along the length of the injector member and are directed downwardly toward the nozzle discharge opening. An oscillating yoke mounted on a rocking shaft engages the collar while the pump piston is coupled to the shaft so that during the reciprocation of the collar and the opening of the nozzle gate, the pump is actuated to deliver fluid through the injector member openings in a spiral pattern into the dough traversing the nozzle. As a result, the dough extruded and cut by the present device is in the form of a tight spiral, the successive convolutions of which are in contact but do not fuse along their contacting surfaces.

It should be understood that the cut pieces of dough may be formed in any desired shape, size and weight depending on the configuration of the nozzle and injector member, the rate of extrusion of the dough and the open interval of the nozzle discharge opening.

Referring now to the drawings which illustrate a preferred embodiment of the present invention, reference numeral 10 generally designates the improved device which includes a dough source 12, an extrusion nozzle 14, a dough cutting mechanism 16 and a fluid injecting arrangement 18. The dough source 12 comprises a pressurized, hermetically sealed hopper 20 of conventional construction provided with a removable lid to facilitate the loading of the hopper with dough, and connected to a source of compressed air 22 of controllable pressure thereby to effect the extrusion of dough from hopper 20 through nozzle 14. The lower end of the hopper 20 is funnel shaped and terminates in a depending externally threaded tubular coupling stub.

Nozzle 14 includes a separably connected and axially aligned upper section 24, intermediate section 26 and lower section 28. The upper section 24 of nozzle 14 comprises an enlarged tapped upper head portion 30 which engages the threaded stub depending from the hopper 20, and a depending tubular cylindrical portion 32 which is externally threaded at its lower end. Radial bores 34 are formed in head portion 30 to accommodate a spanner wrench for facilitating the attachment of the nozzle to the hopper.

Intermediate section 26 of nozzle 14 is of roughly pentagonal transverse cross-section and has a circular bore terminating at its upper end in a peripheral abutment defining shoulder 38. The upper end of bore 36 is enlarged and internally threaded as at 40, threaded portion 40 being separated from shoulder 38 by a peripheral groove 39 and engaging the lower threaded end of the upper nozzle section 24. The underface of the nozzle section 26 is stepped at a corner and an opposite side thereof to provide a short shoulder 42 and a long shoulder 44 respectively, shoulder 42 having a tapped bore formed therein and in shoulder 44, and having a pair of lateral spaced tapped bores formed therein and extending to the nozzle bore 36. A semicircular recess 46 is formed in the shoulder 44, extending radially relative to the bore 36 and between the longitudinal edges of the shoulder 44. Recess 46 is enlarged at its end portions, as indicated at 47.

Lower section 28 of nozzle 14 includes an upper, outwardly directed head portion having an elevated section 48 which engages shoulder 42, and an elevated section 50 which engages shoulder 44, sections 48 and 50 having countersunk bores aligned with the tapped bores formed in the shoulders 42 and 44. Lower section 28 is affixed to the upper nozzle section 26 by suitable bolts, as 51. Formed in the upper face of the raised section 50 is a radially extending semicircular recess 52 which confronts recess 46 to define a circular radial bore located between nozzle sections 26 and 28. Communicating with the recess 52 is a vertical tapped opening through section 28 which is engaged by a set screw 54. The extrusion section 56 of nozzle 14 depends from the head portion of the lower nozzle section and has a vertical axial bore having a tapered upper portion 57 leading to bore 36 and terminating at its bottom in a discharge opening 58. Discharge opening 58 is surrounded by an outwardly directed border 60, the surface of which is in an arcuate cylindrical plane. An outer wall 63 of the extrusion section 56 is vertical and flat and has suitably secured thereto a stop or abutment plate 65 which depends below the corresponding lower edge of the wall 63. The provision of stop 65 ensures accurate severance and dropping of dough pieces through actual contact with gate 26, and linkage 122 may be spring-loaded in the usual manner.

The fluid injection arrangement includes a bushing sleeve 66 of circular cross-section, and having a longitudinal bore 67 of square cross-section, and registering with the radial bore defined by recesses 46 and 52. The position of sleeve 66 along the engaging bore is adjustable by means of set screw 54, see Figure 4. The fluid injecting element comprises a spirally formed tube 68, closed at its free inner end 68a and having a plurality of longitudinally spaced, downwardly directed openings or apertures 69 formed in the bottom wall thereof. The outer open end of the tube 68 is connected to a tubular coupling member 70 having a disc shaped head 72, an intermediate shank 74 of square cross-section and a threaded end shank 76. Head 72 abuts the inner face of the bushing 66, shank 76 registering with bushing bore 67 and extending beyond the bushing 66. A washer and nut 78 and 80 respectively engage the free end of shank 76 and separably lock the injector element assembly to the bushing 66, thus positioning the fluid injecting element 68 in the nozzle 14, see Figure 4. Although the element 68 is illustrated as being spiral, it may assume other forms, sizes and configurations.

Element 68 serves another purpose; that of shaping the dough. As the plastic mass is forced downwardly and past element 68, the spaced convolutions thereof channelize the dough into a coil, see Figure 8. By employing a spiral injector element, cinnamon bun type pieces of dough are produced.

The free outer end of the tubular shank 76 communicates, by way of a coupling member 82 and a tube 84, to the outlet of a suitable metering pump 86, illustrated in the form of a piston pump. Pump 86 includes a cylinder 88 connected to the pump outlet by way of the conventional check valve, the cylinder 88 being immersed in a pool of the liquid to be injected carried in a tank 90, the inlet to cylinder 88 communicating with the fluid. A piston 92 is reciprocable in cylinder 88 and is provided with an upright piston rod 94 which extends above the cylinder 88 and is urged, along with piston 92, to an uppermost position by means of a suitably mounted helical compression spring 96. Pump 86 may be of any conventional type, for example, a piston type lubricating pump. The actuation of the pump 86 will be hereinafter set forth.

A fluid injection system employing a conventional type of metering pump is illustrated in Figure 1A of the drawings, the pump per se including a cylinder 88a, a registering piston 92a provided with an axial extending piston rod 94a urged to its raised position by a spring 96a. The lower section of the piston communicated by way of a check valve C and suitable piping with an elevated fluid tank 90a, and by way of a check valve D and piping 84a to the tubular shank 76 as aforesaid. The actuation of the pump last described is similar to that of the pump 86. It should be noted that the check valves C and D are biased to permit the flow of fluid only in the direction from the tank 90a to tube 84a.

The dough cutting mechanism includes a pair of diametrically-opposed parallel bell cranks 98 pivoted at their knee portions by means of screw pins 100 to opposite sides of nozzle section 26. Each of the bell cranks includes a first depending arm 102 and a second rearwardly directed arm 104. The arms 104 are provided with inwardly directed legs 108 terminating in laterally spaced parallel apertured lugs or ears 110 which support a laterally extending tie-pin 112. A collar 114 having a peripheral groove 116 formed therein, on the outer aspect thereof, slidably engages nozzle portion 32, and is provided with a pair of spaced outwardly directed parallel legs 118 which support a tie-pin 120. Pin 120 is coupled to the pin 112 by linkage 122 which is adjustable in length so that reciprocation of the collar 114 on the nozzle section 32 effects a rocking of the bell cranks 98 within desired limits.

A rectangular gate member 126 extends across the nozzle discharge opening 58 and is separably secured to the underfaces of the bell crank first arms 102 by screws 128 engaging countersunk openings in the sides of the gate 126 and aligned tapped bores in the arms 102. The upper face of the gate 126 has a cylindrical cavity 130 formed therein, the surface of which face is in close sliding contact with the cylindrical border of discharge opening 58 with respect to which gate 126 may be rocked between fully open and fully closed nozzle positions. The position of the confronting surfaces of gate 126 and opening border 60 may be adjusted by means of the pairs of set screws 133 engaging tapped bores in gate 126 opposite the bolts 128 and bearing against the underfaces of arms 102.

Collar 114 is oscillated by yoke member 132 mounted on oscillating shaft 134, yoke 132 being provided with inwardly directed pins 135 engaging groove 116 in the collar. Also mounted on oscillating shaft 134 is an arm 136, a rearward extension of member 132, the free end of which bears upon the upper end of piston rod 94. Thus, upon clockwise oscillation of shaft 134, yoke 132 raises collar 114 thereby to open gate 126, piston 92 is depressed to deliver fluid to injection element 68.

Considering now the operation of the improved device described above, dough is loaded into hopper 12 in the usual manner, the lid is closed and pressure built up and applied while the gate 126 is in its closed position, as illustrated in Figure 3 of the drawings. Tank 90 is filled with any desirable liquid which will prevent the adherence between the opposing faces of superimposed or juxtaposed layers of dough. This liquid may be of any suitable composition; as an example, an emulsion of cottonseed oil and powdered cinnamon has been found to be highly satisfactory. Other liquids may be employed likewise, such as other type of oils, jellies, water, aqueous solutions, or other materials which may be pumped and extruded through discharge openings.

A tray or conveyor is disposed below the dough forming device 10, and the shaft 134 is oscillated by any suitable drive means (not shown). As the shaft 134 turns in a clockwise direction, as indicated in Figure 1 of the drawings, yoke 132 raises collar 114, which in turn rotates the bell crank 98 to swing the gate 126 to open position, out of registry with the nozzle discharge opening 58. The pressure within the hopper 12 against the mass of dough causes travel thereof towards and through nozzle 14 and out of the nozzle discharge opening 58.

During the opening cycle of the gate 126, as above set forth, arm 136 swings downwardly to depress piston rod 94 and piston 92, thereby forcing fluid from cylinder 88 through pipe 84, into the convolutions of injector element 68 and thence out therefrom through openings 69 thereof (in a helical pattern) into the travelling dough. As shaft 134 rocks in a reverse counterclockwise direction to its return position, gate 126 is slid to its closed position and arm 126 is lifted, permitting spring 96 to return piston 92 to its upper position and allowing cylinder 88 to refill with liquid. As gate 126 returns to its closed position, the portion of the dough extruded through orifice 58 is severed from the main body of the dough within the nozzle, permitting the spirally formed piece of dough to fall upon the waiting tray or conveyor. The piece of dough D assumes the shape substantially shown in Figure 8 of the drawings and maintains its spiral configuration without refusion by reason of the intervening spiral layer of the fluid material. In the absence of such fluid material, the piece of dough D would lose its spiral form and fuse into a single rounded lump of dough.

It is to be understood, of course, that various shapes, weights and arrangements of dough may be formed by controlling the pressure within the hopper 12, the opening interval of the gate 126, the shape of the injector element 68 and other variables. Furthermore, the amount of liquid injected into the travelling dough may be varied as desired by adjusting the capacity and stroke of the pump 88.

It will be apparent, from the foregoing, that the apparatus described herein, operating as it does in a positive manner subject to time control, will readily adapt the use thereof to automatic synchronization with such subsequent operations as proofing, and the like, whereas previous known methods and machinery, operating in haphazard manner, would not be so adaptable.

While there has been described and illustrated a preferred embodiment of the present invention, it is apparent that numerous alterations and omissions may be made without departing from the spirit of the appended claims.

I claim:

1. An improved device for producing shaped pieces of dough comprising a nozzle having a discharge opening, means for extruding dough through said nozzle and discharge opening, an elongated substantially spiral fluid injecting member located in said nozzle and supported by a wall thereof and extending transversely and to the wall of said nozzle and having openings formed along substantially the full length thereof, a fluid reservoir, a pump connected between said injecting member and said fluid reservoir and means associated with said nozzle discharge opening for transversely cutting the dough extruded therethrough.

2. An improved device for producing shaped pieces of dough comprising a nozzle having a discharge opening, means for extruding dough through said nozzle and discharge opening, an elongated substantially spiral tubular fluid injecting member located in said nozzle and supported by a wall thereof and extending transversely and to the wall of said nozzle and having openings formed along substantially the full length thereof, a fluid reservoir, a pump connected between said injecting member and said fluid reservoir, and a gate member periodically movable across said nozzle discharge opening between an open and closed position.

3. An improved device for producing shaped pieces of dough comprising a source of dough under pressure, a nozzle connected at one end thereof to said source of dough under pressure and having a discharge opening at the other end thereof through which said dough is extruded, an elongated substantially spiral tubular fluid injecting member located in said nozzle and supported by a wall thereof and extending transversely and to the wall of said nozzle and having openings formed along substantially the full length thereof, a fluid reservoir, a pump connected between said injecting member and said fluid reservoir and means located forward of said nozzle discharge opening for transversely cutting the dough extruded therethrough.

4. An improved device for producing shaped pieces of dough comprising a nozzle having a discharge opening, means for extruding dough through said nozzle and discharge opening, a spirally shaped tubular fluid injecting member located in said nozzle and supported by a wall thereof and extending transversely and to the wall of said nozzle and having longitudinally spaced openings formed therein along substantially the full length thereof.

5. An improved device in accordance with claim 4, wherein said openings formed in said injecting member are directed toward said discharge opening.

6. The device of claim 4, wherein the nozzle wall is apertured at the point of support of the fluid injecting member, and a source of fluid under pressure is disposed outside the nozzle and in communication with said nozzle aperture and the fluid injecting member.

7. An improved device for producing shaped pieces of dough comprising a nozzle having a discharge opening, means for extruding dough through said nozzle and discharge opening, an elongated substantially spiral tubular fluid injecting member located in and extending transversely of and supported by a wall of said nozzle and having openings formed along substantially the full length thereof, a fluid reservoir, a pump connected between said injecting member and said fluid reservoir, and means located forward of said nozzle discharge opening for transversely cutting the dough extruded therethrough.

References Cited in the file of this patent

UNITED STATES PATENTS

| | | |
|---|---|---|
| 729,933 | Heilmann-Taylor | June 2, 1903 |
| 1,477,857 | Vierow | Dec. 18, 1923 |
| 2,111,497 | Shannon | Mar. 15, 1938 |
| 2,531,127 | Hershey et al. | Nov. 21, 1950 |
| 2,649,744 | Elwell | Aug. 25, 1953 |
| 2,840,012 | Giles | June 24, 1958 |